United States Patent [19]

Tanaka et al.

[11] 4,364,642
[45] Dec. 21, 1982

[54] ZOOM ELEMENT FOCUSABLE ZOOM LENS

[75] Inventors: Kazuo Tanaka, Tokyo; Ryusho Hirose, Machida, both of Japan

[73] Assignee: Canon Kabushiki Kaisha, Tokyo, Japan

[21] Appl. No.: 176,570

[22] Filed: Aug. 11, 1980

Related U.S. Application Data

[63] Continuation of Ser. No. 882,115, Feb. 28, 1978, abandoned.

[30] Foreign Application Priority Data

Mar. 1, 1977 [JP] Japan ................... 52-21889

[51] Int. Cl.³ .................. G02B 7/10; G02B 15/16
[52] U.S. Cl. ...................... 350/429; 350/427
[58] Field of Search ................. 350/427, 429

[56] References Cited

U.S. PATENT DOCUMENTS

| | | | |
|---|---|---|---|
| 3,391,973 | 7/1968 | Laurent | 350/427 |
| 3,614,207 | 10/1971 | Basista | 350/427 |
| 4,043,642 | 8/1977 | Hirose et al. | 350/429 |

Primary Examiner—John K. Corbin
Assistant Examiner—Rebecca D. Gass
Attorney, Agent, or Firm—Toren, McGeady & Stanger

[57] ABSTRACT

A zoom objective includes four lens groups of which the first and fourth groups are stationary, while the second and third groups are movable independently of each other. Focus adjustment of one of the second and third groups is followed by zooming relative movement of the latter two. To maintain a constant zoom ratio throughout the entire focusing range, the relative movement of the second and third groups is controlled to effect monotonic variation of the magnifying powers of the second and third groups by means of the following formulae as embodied in a microcomputer.

$$\text{Zoom Ratio} = Z[S_1, X_1, X_2(S_1, X_1)]$$

$$dZ/dS_1 = 0$$

wherein $S_1$ is the object distance; and $X_1$ and $X_2$ are the amounts of movement of the second and third groups with zooming respectively.

2 Claims, 18 Drawing Figures

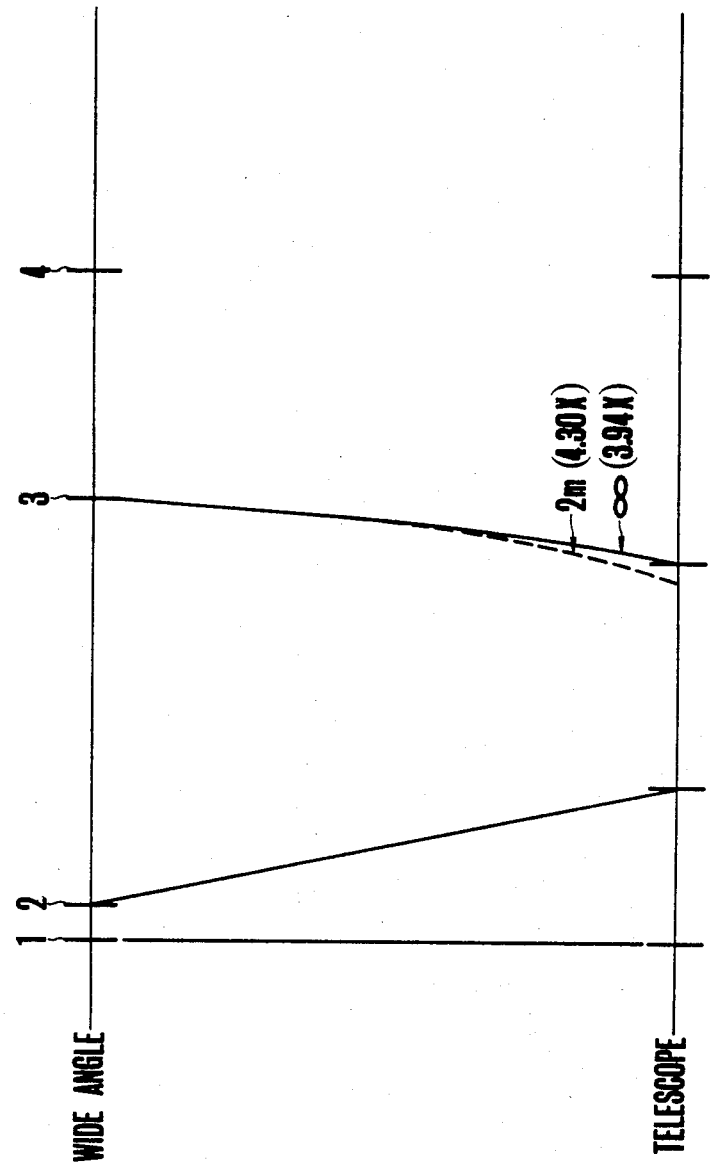

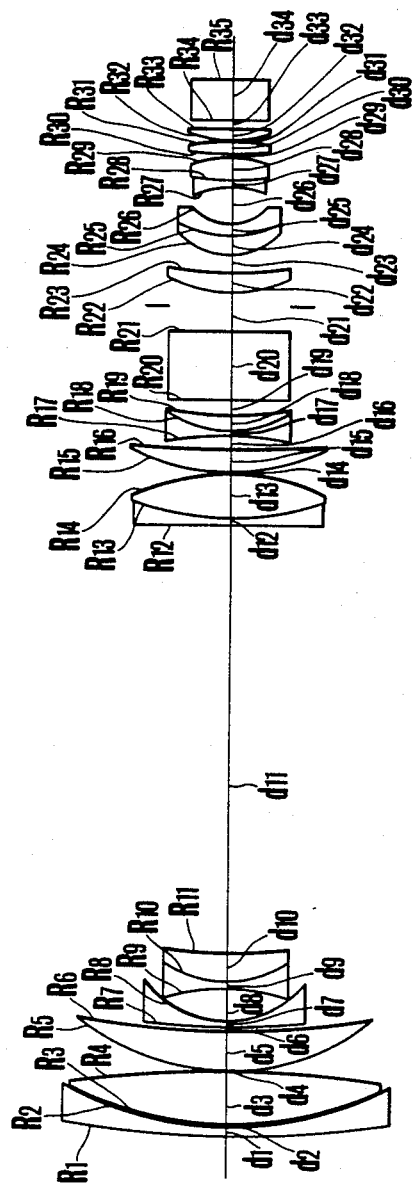
FIG.7A (WIDE-EDGE, OBJECT DISTANCE ∞)
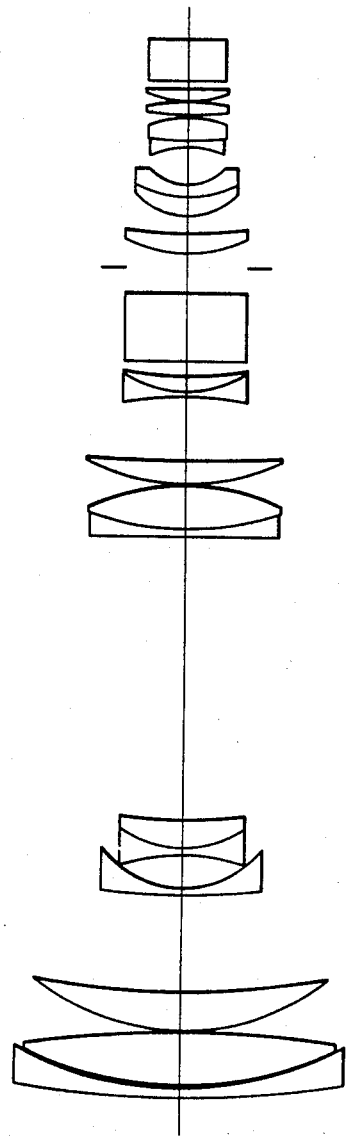
FIG.7B (TELE-EDGE, OBJECT DISTANCE ∞)

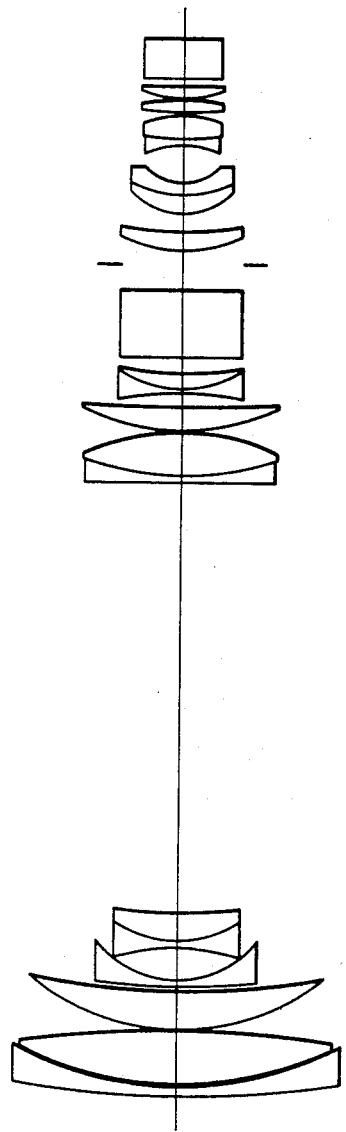

FIG.9A (WIDE-EDGE. OBJECT DISTANCE ∞)
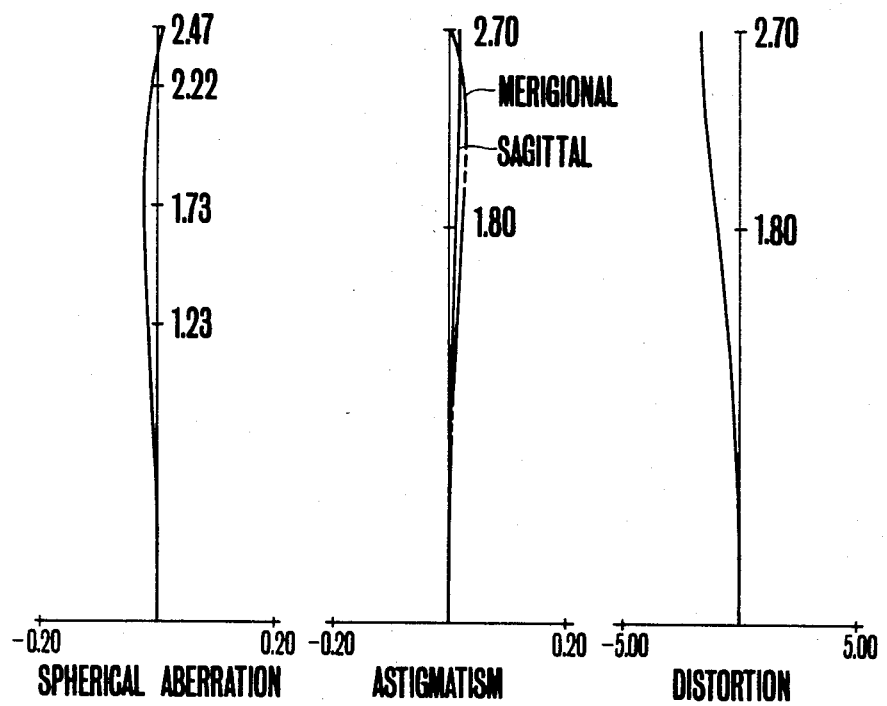
FIG.9B (TELE-EDGE. OBJECT DISTANCE ∞)
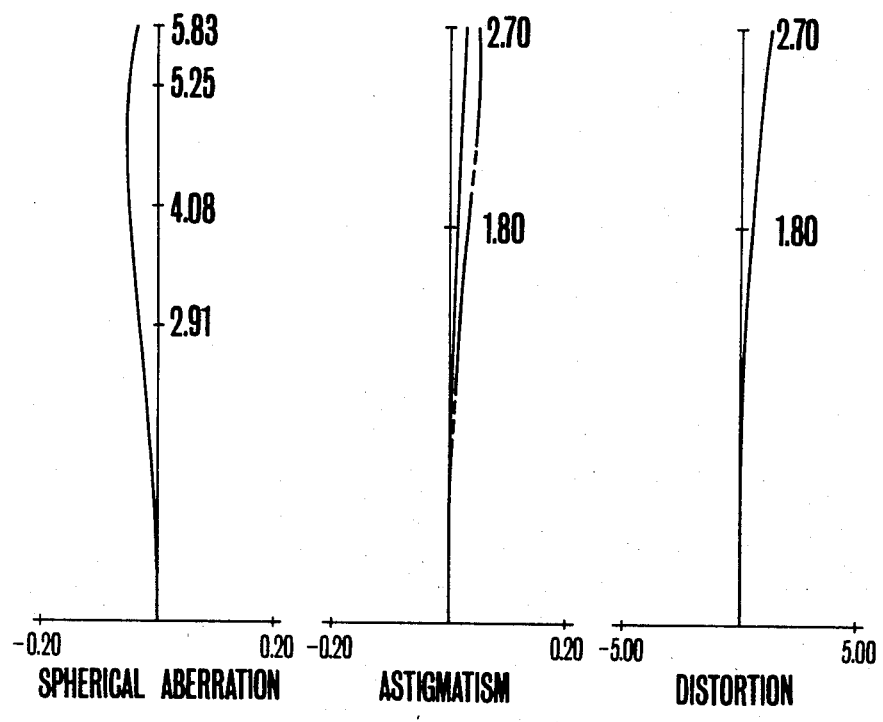

FIG.10A (WIDE-EDGE. OBJECT DISTANCE 5m)
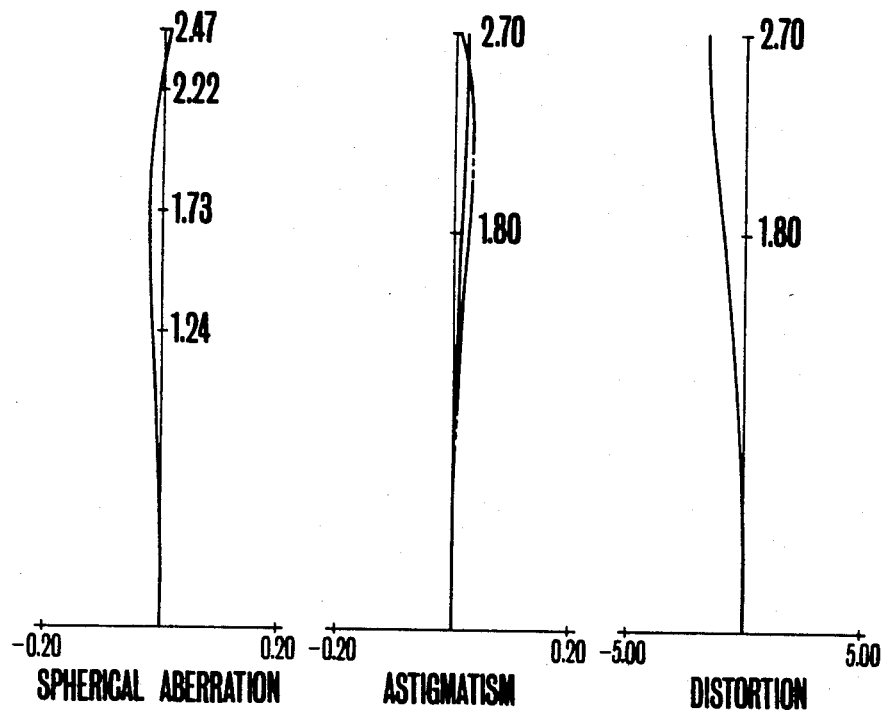
FIG.10B (TELE-EDGE. OBJECT DISTANCE 5m)
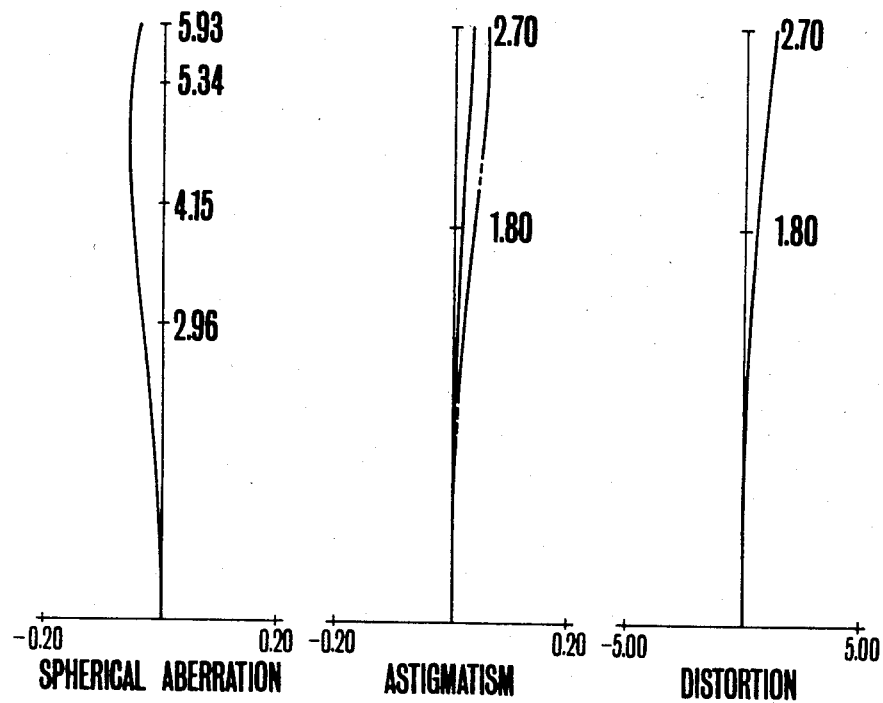

ZOOM ELEMENT FOCUSABLE ZOOM LENS

This is a continuation of Application Ser. No. 882,115, filed Feb. 28, 1978 now abandoned.

BACKGROUND OF THE INVENTION

This invention relates to zoom systems, and more particularly to a zoom objective lens having a plurality of groups of lens elements movable for zooming, with provision for focusing at one of the groups.

Commonly available zoom objective lenses generally include a front lens, a variator, a compensator and a relay and permit axial movement of the front lens for focusing purposes. As an object to be photographed close up, however, the front lens is usually moved forward to limit the angular field in the object space. For assurance of full aperture of a given diaphragm at all focusing stations, the diameter of the front lens must be increased to a reasonable extent. Compared with the variator and those that follow, therefore, the focusing lens becomes so heavy and bulky that the complete objective turns out not to be suited for use with small photographic cameras.

In order to minimize the size and weight of the objective, focusing may be performed by an independent axial movement not of the front lens but of the compensator, as disclosed in U.S. Pat. No. 4,043,642 assigned to the assignee of the present invention. Such complex movement of the compensator with focusing and zooming may be understood by referring to FIGS. 1 and 2 in which a zoom objective having four lens groups is shown in two different operating positions. The first and fourth groups 11 and 14 are stationary, while the second and third groups 12 and 13 are movable independently of each other. The axial movement of the second group 12 contributes mainly to variation of the focal length of the system, while accommodation for change of object position and the image shift compensation have to be achieved by the axial movement of the third group so as to maintain the system's focal plane stationary in coincidence with the film plane 15 throughout the focusing range and throughout the zooming range.

With the zoom objective set at the minimum focal length and focused for infinity, the lens groups 12 and 13 are assumed to occupy respective reference positions. When the lens group 13 is displaced from this reference position by a distance designated X1 as shown in FIG. 1, the entire system can be focused for an object 10 at a finite distance. In FIG. 2, the second lens group 12 may be displaced a distance designated X2 to vary focal length of the entire system with a simultaneous corresponding image shift from the film plane along the optical axis. The necessary image shift compensation can be effected by the additional axial displacement of the third lens group 13. The total amount of the successive displacements of the third lens group 13 designated by Z in FIG. 2 is varied as a function of not only X2 but also the object distance, S1.

Since the object distance S1 can be estimated by the distance X1, through which the third lens group 13 is moved from the reference position for focusing, the above mentioned function can be defined in the form of $Z=F[X2, S1(X1)]$ with the various parameters determined based on the refractive powers of the individual lens elements and the principal point intervals. Provision is made for automatic adjustment of the third lens group 13 in position during zooming as by use of a microcomputer responsive to electrical detection of the variables X1 and X2 for producing an output signal which is utilized to drive a zoom control mechanism including an electric motor. Thus, the later relative zooming movement of the second and third lens groups 12 and 13 provides a desired range of variation of the focal length of the entire system at any previously adjusted focusing station.

On the other hand, the zoom lens design process may be outlined as comprising the steps of: (1) calling for suitable selection from the available efficient and flexible set of zooming methods such as that which is characterized by linear axial movement of the variator accompanied with reciprocating movement of the compensator during zooming; (2) defining a specific power distribution of the various lens elements in the Gauss region so as to fulfill the requirements concerning with the zoom ratio and physical dimensions; and (3) solving the aberrational problem by computing Seidel's coefficients at three points selected to coincide with the maximum, medium and minimum focal lengths of the entire system and simultaneously by tracing the rays which contribute to production of aberrations, such computation and ray tracing procedure being repeated until good stabilization of aberration correction is obtained throughout the zooming range.

The selection of an appropriate zooming method is a most fundamental item in constructing a zoom objective which is capable of the desired optical performance. However, the present inventors have found that the techniques characteristic of U.S. Pat. No. 4,043,642 are not always efficient and flexible in application to all the types of zoom lenses. In some of the zooming methods, the zoom ratio decreases as the object distance is shortened.

SUMMARY OF THE INVENTION

Accordingly, it is an object of the present invention to provide a zoom objective lens having a focusing provision made at one of two successive lens groups which are later moved for zooming in a space between two stationary lens groups, while the zoom ratio is maintained almost constant over the entire focusing range.

In one embodiment of the present invention, the zoom objective lens comprises a first stationary lens group counting from the front, first and second movable lens groups for zooming, and a second stationary lens group, said movable lens groups being arranged to operate with zooming and focusing control means which are interrelated to assure maintenance of an almost constant zoom ratio at any previously adjusted focusing station.

To facilitate avoidance of decreasing zoom ratio with decrease in the object distance, the present invention contemplates monotonically varying the magnifying powers of the aforesaid first and second movable lens groups when zooming. By taking into account this fact, the aforesaid interrelating means is constructed so that the first and second movable lens groups are moved in only one individual direction throughout the entire range of their relative zooming movement, as zooming from the shortest to the longest focal length range, and vice versa.

An advantage of the present invention arising from configuration of the first and second movable lens groups to increase both of their magnifying powers when zooming from the shortest to the longest focal length range is that the zoom ratio becomes larger at close-ups than at infinity as contrary to the prior art.

The various features of novelty characterizing the invention are pointed out in the claims. Other objects and advantages of the invention will become evident from the following description when read in light of the drawings.

BRIEF DESCRIPTION OF THE DRAWINGS

FIGS. 4, 5 and 6 graphically illustrate the traces of relative zooming movement controlled in accordance with the present invention.

FIGS. 7A, 7B, 8A and 8B are diagrammatic views of an example of a specific zoom objective lens of the present invention shown in the wide angle and tele-photo positions with object at infinity and at a distance of 5 meters as the case may be.

FIGS. 9A, 9B, 10A and 10B are graphic representations of spherical aberration, astigmatism and distortion of the lenses of FIGS. 7 and 8 when set at the wide-angle and tele-photo settings respectively.

DESCRIPTION OF THE PREFERRED EMBODIMENT

Figure 1:
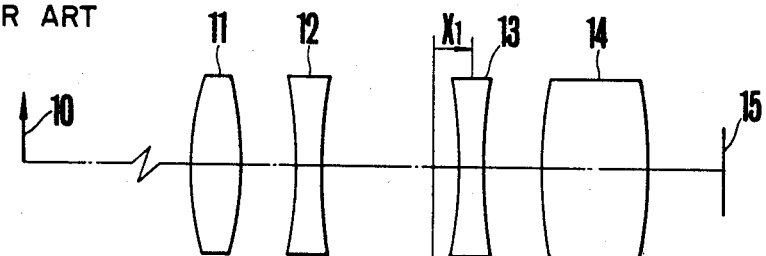
FIGS. 1 and 2 are lens block diagrams showing a known zooming method to which the present invention relates.
Figure 2:
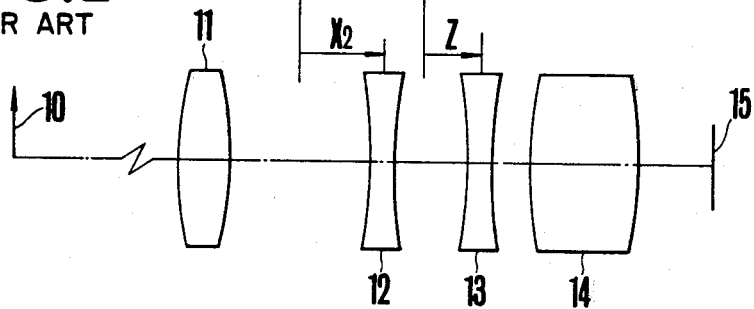

Discussion will now be given to the problem of finding a mathematical relationship between the zoom ratio and the object distance. As far as a four-component zoom objective lens of the type in which the second and third components are movable for zooming is concerned, when the first or front component is made movable in part or wholly for focusing as is usual in the conventional zoom lens, any change in the object distance does not affect the lateral magnifications (magnification of image) of the second and third components, and therefore the zoom ratio is maintained constant throughout the focusing range. When the focusing is carried out at one of these zoom control components as in the invention, however, the lateral magnifications of the second and third components vary with object distance. Therefore, the zoom ratio also varies with object distance.

The zoom ratio for a finite object distance may be defined in terms of the lateral magnification of the entire system. Letting $B_W$ denote the lateral magnification at the wide angle setting and $B_T$ the lateral magnification at the tele-photo setting, we have the zoom ratio Z as expressed by:

$$Z\{S1, X1, X2, (X1, S1)\} = B_W/B_T$$

wherein $$1/B_W = [S1, \psi 1, -e'10, \psi 2, -e'20, \psi 3, -e'30, \psi 4]$$

$$1/B_T = [S1, \psi 1, -(e'10 + x1), \psi 2, -(e'20 - x1 + x2), \psi 3, -(e'30 - x2)\psi 4]$$

$S_1$: the object distance measured from the front principal point of the first lens group;

$\psi i$: the power of the i-th group;

$e'_{i0}$: the interval of the principal points of the i-th and (i+1)th groups when set in the wide angle position;

$x_1$: the amount of movement of the second group during the zooming measured from the wide angle position;

$x_2$: the amount of movement of the third group during the zooming measured from the wide angle position;

[]: Gaussian Brackets (see Journal of Optical Society of America, Vol. 33, No. 12, p. 651, 1943)

Differentiating the general equation for Z with respect to $S_1$, we obtain the derivative, $$\frac{dZ}{dS_1} = Z \left[ (\Phi_W B_W - \Phi_T B_T) + \left\{ \psi_{34W}\beta_{34w}\left(\frac{\beta^2_{13W}}{\beta^2_{3W-1}}\right) - \psi_{34T}\beta_{34T}\left(\frac{\beta^2_{13T}}{\beta^2_{4T-1}}\right)\right\} - \left\{ \psi_{4W}\beta_{4W}\left(\frac{\beta^2_{13W}}{\beta^2_{3W-1}}\right) - \psi_{4T}\beta_{4T}\left(\frac{\beta^2_{13T}}{\beta^2_{3T-1}}\right)\right\}\right]$$

wherein

Φ: the power of the entire system;

B: the lateral magnification of the entire system;

$\psi_{ij}$: the power of that section of the system which is from the i-th group; p1 $\beta_{ij}$: the lateral magnification of that section of the system which is made from the i-th to the j-th group; and $\beta_i$: the lateral magnification of the i-th group.

The symbols with suffixes W and T indicate quantities taken at the wide angle and telephoto settings respectively.

In practice, it has been proven that this condition can be set to have any sign, positive or negative. Under the condition of a positive sign the zoom ratio is increased with decrease in the object distance. By the selection of a zooming method such that the magnifying powers of the second and third groups are varied monotonically, as in the present invention, it is made possible to reduce the value of dZ/dS1 to zero. If so, the zoom ratio may be maintained constant throughout the entire range of focusing movement of either one of these two groups.

Figure 3:
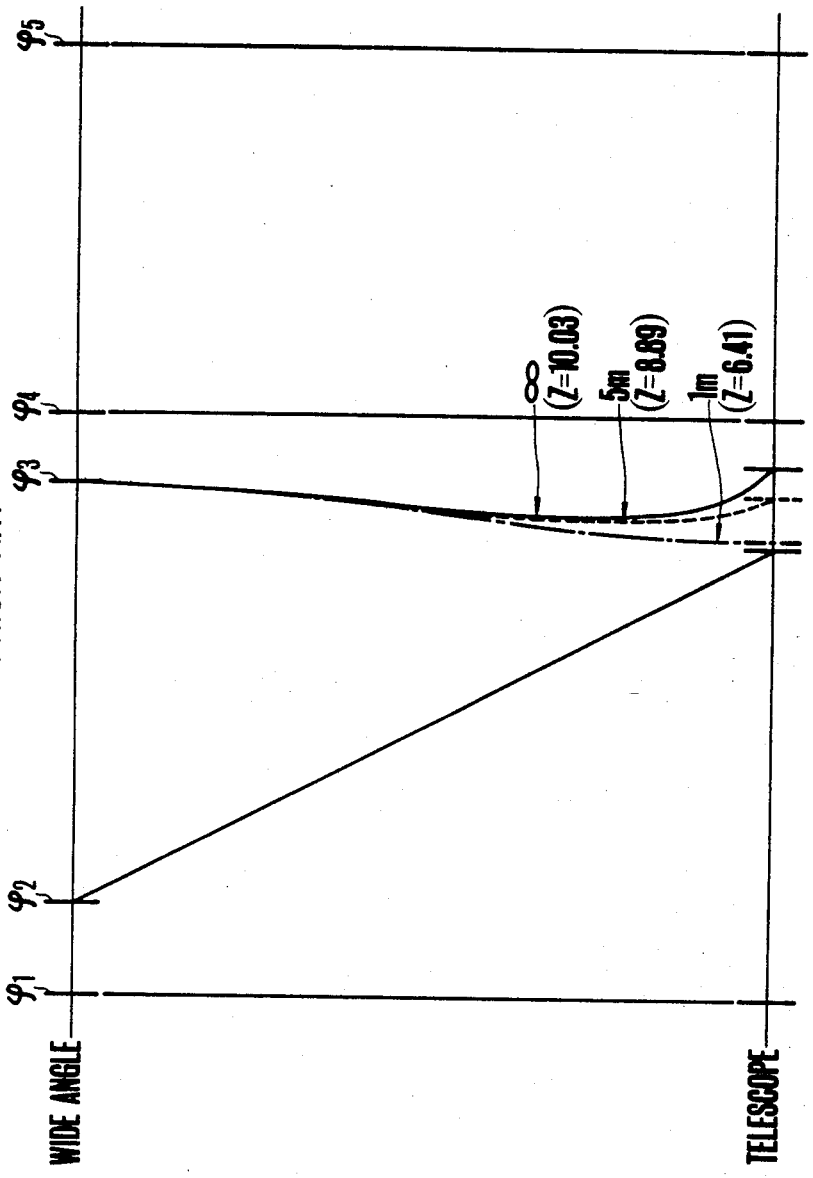
FIG. 3 graphically illustrates the traces of relative zooming movement controlled according to the prior art at three focusing stations.

The otherwise selection of any zooming method which is characterized by the lack of monotonic variation of the magnifying powers of the zoom control lens groups will lead to a decrease in the zoom ratio as the object distance is shortened. An example of the prior art zoom lens is shown in FIG. 3 as comprising a stationary front lens, a variator, a compensator and a stationary relay, the variator being moved in a linear manner during the zooming, while the compensator is caused to reciprocate in a convex manner toward the front. Let us assume that this zoom lens is constructed to provide a power distribution with the numerical values given in Table below:

TABLE 1

| | (with object at infinity) | | | |
|---|---|---|---|---|
| Lens | Front lens | Variator | Compensator | Relay |
| Power | 0.0964 | −0.0471 | −0.0187 | 0.0163 |
| Separation | | 16 | 70.4996 | 73.5011 |

The total amount of movement of the variator is determined to be 55 mm, and the zoom ratio for object at infinity is determined to be 10.03. For objects at a distance of 5 meters measured from the front principal point of the front lens group, the zoom ratio is decreased to 8.89. For objects at a distance of 1 meter, the zoom ratio is 6.41. The traces of axial movement of the compensator for the image shift compensation at the three different focusing stations are shown by the solid, dashed and dot-and-dash lines in FIG. 3 respectively. The front lens, variator, compensator and the front and rear parts of the relay are indicated at $\psi1$, $\psi2$, $\psi3$, $\psi4$ and $\psi5$. At the three different focusing stations, the corresponding positions of the compensator though being different from each other may be considered to be coincident with each other because of the negligibly small difference therebetween.

One embodiment of the present invention will next be explained below. The zoom objective lens comprises a stationary first lens group, a movable second lens group of negative power, a movable third lens group of positive power and a stationary fourth lens group. The focusing provision is made at the third lens group. When the entire system is zoomed from the shortest to the longest focal length range, the second lens group is moved toward the image plane in a linear manner, while the third lens group is moved toward the image plane in a non-linear manner. This zoom lens can be designed to have a specific power distribution with the numerical values given in Table 2 below.

TABLE 2

| | (with object at infinity) | | | |
|---|---|---|---|---|
| Lens | First | Second | Third | Fourth |
| Refractive Power | 0.0172 | −0.0812 | 0.0161 | 0.0177 |
| Interval between Principal Points | −20.2248 | 15.3729 | 105.4411 | |

Figure 4:
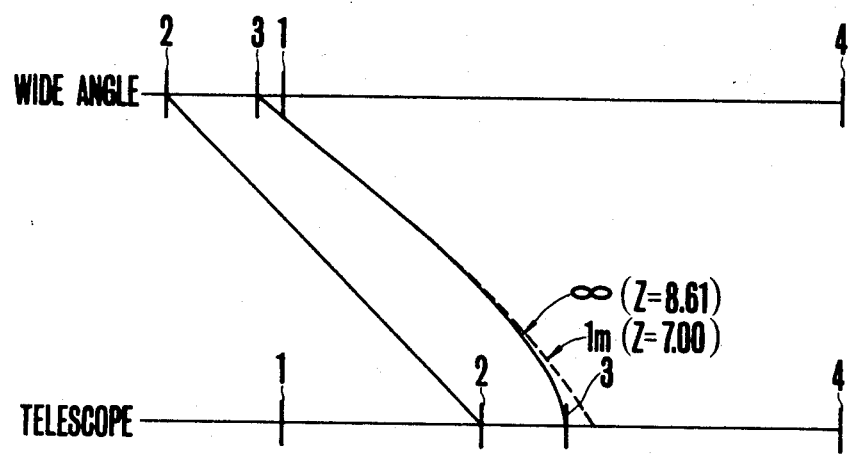

The maximum possible amount of axial movement of the second group is determined to be 55 millimeters, and the magnifying power of the second group is varied monotonically from $-0.18\times$ to $-1.11\times$ when zooming from the wide angle setting to the telephoto setting, while the magnifying power of the third lens group is varied monotonically from $1.98\times$ to $2.79\times$. With this zoom lens focused for object at infinity, the zoom ratio is found to be 8.61. When the object distance is shortened to 5 meters, the zoom ratio is decreased to 7.91. Thus, the otherwise resulting loss in zoom ratio is largely saved by the use of that zooming method. FIG. 4 shows the traces of their relative zooming movement with the reference numerals 1 to 4 indicating the positions not of the lens group themselves but of their principal points.

To achieve further improvement of the zoom ratio, another embodiment is provided comprising a stationary first lens group of positive power, a movable second lens group of negative power, a movable third lens group of positive power, and a stationary fourth lens group of positive power, the third lens group also serving as the focusing group. The second group is moved toward the image plane in a linear manner when zooming from the shortest to the longest focal length range, while the third group is moved towards the front in a non-linear manner to effect the image shift compensation. During zooming, the second and third, groups are moved in the opposed positions with monotonic variation of their magnifying powers which are prevented from taking unity magnification of negative sign simultaneously when focused upon infinity. The reason why such condition is required, though simultaneous occurrence of the unity magnifying powers does not occur unless the object distance is not short enough, is that it becomes impossible to focus the system on objects at a longer distance when in the neighbourhood of unity magnification. The numerical data for a refractive power distribution of this zoom lens with object at infinity are given in Table 3 below.

TABLE 3

| Lens | First | Second | Third | Fourth |
|---|---|---|---|---|
| Refractive Power | 0.005 | −0.025 | 0.02 | 0.01 |
| Interval between Principal Points | | 5 | 170.352 | 64.648 |

Figure 5:
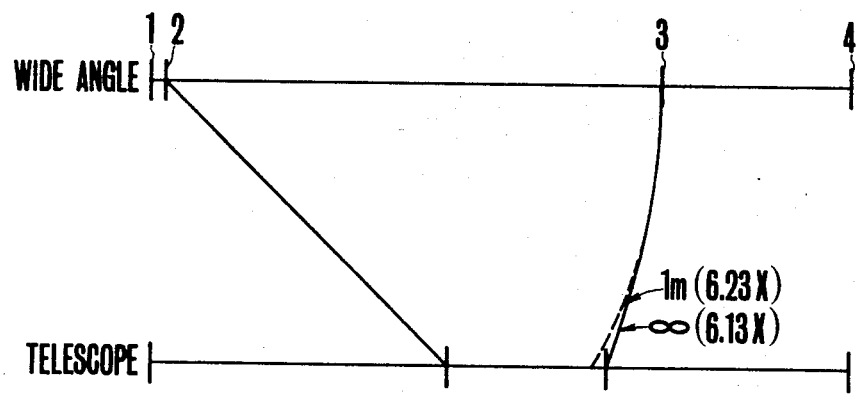

With this zoom lens focused for object at infinity, the zoom ratio is determined to be 6.13. At an object distance of 6 meters, it becomes 6.23. Thus, the zoom ratio is maintained almost constant over the entire range of focusing movement of the third group. The traces of relative zooming movement of the second and third groups are shown with respect to the principal points thereof in FIG. 5. The magnifying power of the second group is decreased monotonically from $-0.27\times$ to $-1.6\times$ when zooming from the shortest to the longest focal length range, while the magnifying power of the third group is decreased from $-0.3$ to $-1.5$.

FIG. 6 shows another embodiment of the present invention. The zoom lens of which the refractive power distribution is specified in Table 4 comprises a positive first group, a negative second group, a positive third group and a negative fourth group arranged in this order from the front along the common optical axis, the second group having the function of varying the focal length of the entire system, and the third group having the functions of compensating the image shift and of focusing adjustment. During the zooming from the shortest to the longest focal length range, the second group is moved toward the image plane linearly, and the third group is moved toward the front nonlinearly.

TABLE 4

| Lens | First | Second | Third | Fourth |
|---|---|---|---|---|
| Refractive Power | 0.0183 | −0.08 | 0.0364 | −0.0999 |
| Interval between Principal Points | | 6 | 67.846 | 38 |

The maximum possible amount of axial movement of the second group is 20 millimeters, and the zoom ratio is 3.9 for objects at infinity and 4.3 for objects at a distance of 2 meters. At the focusing station for objects at infinity, there is no position in which the second and third groups have magnifying powers of unity. When zooming from the shortest to the longest focal length range with object at infinity, the magnifying powers of the second and third groups are monotonically decreased from −0.35 and −0.48 to −0.78 and −0.85 respectively.

The present invention has been described in connection with a thin lens systems which can be made thick lenses. An example of a specific zoom objective lens of the invention may be constructed in accordance with the numerical data given in Table 5 below. The radii of curvature, the axial thicknesses of the various lens elements with their axial separations, the refractive indices, and the dispersive indices are indicated by R, d, N and V respectively.

TABLE 5

|    | R          | d       | N       | V     |
|----|------------|---------|---------|-------|
| 1  | 176.92087  | 1.700   | 1.80518 | 25.40 |
| 2  | 58.38933   | 0.36558 |         |       |
| 3  | 62.19996   | 8.500   | 1.64000 | 60.10 |
| 4  | −191.81790 | 0.200   |         |       |
| 5  | 39.65740   | 6.500   | 1.64000 | 60.10 |
| 6  | 143.01739  | $D_1$*  |         |       |
| 7  | 129.78502  | 1.000   | 1.71300 | 53.90 |
| 8  | 16.80761   | 5.300   |         |       |
| 9  | −34.01836  | 1.100   | 1.69680 | 55.50 |
| 10 | 18.95590   | 4.650   | 1.80518 | 25.40 |
| 11 | 92.16712   | $D_2$*  |         |       |
| 12 | −838.27520 | 1.190   | 1.80518 | 25.40 |
| 13 | 52.24124   | 6.980   | 1.64000 | 60.10 |
| 14 | −38.78419  | 0.200   |         |       |
| 15 | 38.18037   | 3.710   | 1.65160 | 58.60 |
| 16 | 307.10520  | $D_3$*  |         |       |
| 17 | −57.60570  | 0.800   | 1.65844 | 50.90 |
| 18 | 19.47250   | 2.500   | 1.78470 | 26.20 |
| 19 | 52.49000   | 2.350   |         |       |
| 20 | 0.00000    | 11.000  | 1.63854 | 55.40 |
| 21 | 0.00000    | 6.290   |         |       |
| 22 | 23.66123   | 3.240   | 1.76200 | 40.20 |
| 23 | 68.22152   | 2.730   |         |       |
| 24 | 11.87949   | 3.070   | 1.71300 | 53.90 |
| 25 | 19.40767   | 1.870   | 1.80518 | 25.40 |
| 26 | 8.62434    | 6.000   |         |       |
| 27 | −14.71268  | 1.000   | 1.80518 | 25.40 |
| 28 | 48.53416   | 3.730   | 1.69100 | 54.80 |
| 29 | −20.15659  | 0.560   |         |       |
| 30 | 95.96153   | 2.060   | 1.66680 | 33.00 |
| 31 | −36.77944  | 0.100   |         |       |
| 32 | 19.73249   | 1.980   | 1.58267 | 46.40 |
| 33 | −413.07403 | 1.200   |         |       |
| 34 | 0.00000    | 6.800   | 1.63854 | 55.40 |
| 35 | 0.00000    | 9.300   |         |       |

| Variable Separations with Object at Infinity | | | |
|---|---|---|---|
| Focal Length | $D_1$* | $D_2$* | $D_3$* |
| 7.099990 | 0.45520 | 68.35847 | 1.97315 |
| 16.797524 | 15.4552 | 45.2440 | 10.0877 |

Figure 11:
FIG. 11 graphically illustrates the traces of relative zooming movement of the second and third groups of the zoom objective lenses of FIGS. 7 and 8 using thin lenses with the object at a finite distance.

The four different operating positions of the zoom objective lens are shown in FIG. 7A for the wide angle setting with object at infinity. FIG. 7B for the telephoto setting with the same object distance. FIG. 8A for the wide angle setting with object at a distance of 5 meters, and FIG. 8B for the telephoto setting with the same object distance. The various aberrations attained in these positions are shown in FIGS. 9A, 9B, 10A and 10B respectively. The traces of relative zooming movement of the two movable groups of lens elements are shown in FIG. 11 by the solid curves for infinitely distant objects and by dashed line curves for an object distance of 5 meters, as far as the thin lens design of the objective of FIGS. 7 and 8 is concerned. The zoom ratio for an object at infinity is determined to be 2.366, and for a 5 meter object distance to be 2.374.

Figure 12A:
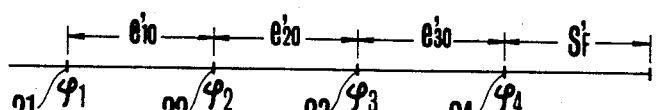
FIGS. 12A and 12B are diagrams of a refractive power distribution with the various lens parameters considered to derive a function of zooming and focusing control.
Figure 12B:
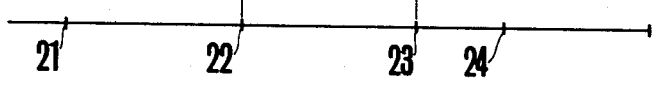
Figure 13:
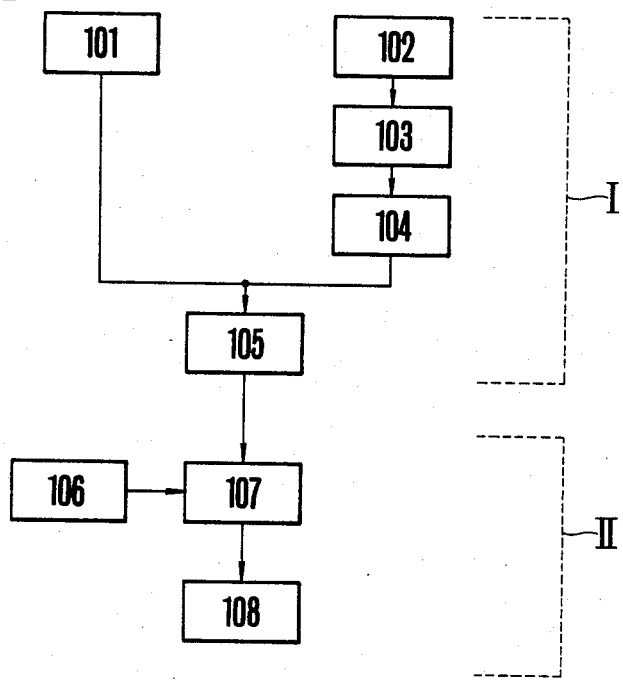
FIG. 13 shows an example of the programming for the function of FIG. 12.

Provision is made for controlling operation of the zoom objective of the invention so as to adjust the position of the compensator in accordance with the given object distance and the desired focal length. FIG. 12 shows the refractive power distribution of the zoom objective with the stationary first lens group 21 having a power $\psi 1$, the movable second lens group 22 having a power $\psi 2$, the movable third lens group 23 having a power $\psi 3$ and serving as the focusing lens group, and the stationary fourth lens group 24 having a power $\psi 4$, when set in the wide angle position. In this setting, the interval between the principal points of the i-th and (i+1)-th lens groups is designated by $e'_{i0}$ and the back-focus by $S'_F$. Let us assume that the zoom objective is left unchanged from the once operated position as the second and third groups 22 and 23 are displaced from the reference positions of FIG. 12A by respective distances, $x_1$ and $x_2$ as shown in FIG. 12B, then these distances $X_1$ and $X_2$ are detected through processes in blocks 101 and 102 of FIG. 13. When the third group 23 is moved for focusing purpose, the additional amount of movement of this lens $\Delta x_2$ is detected through a process in block 103. A process in block 104 computes the total amount of movement $X_2$ of the third group 23 based on the formula $$X_2 = x_2 + \Delta x_2$$

According to the detected values of $x_1$ and $X_2$ by the processes 101 and 104, a process 105 computes the object distance $S_1$ based on the formula:

$$S_1 = 'Bs/'As$$

$$'As = [\psi_1, -e'_1, \psi_2, -e'_2, \psi_3, -e'_3, \psi_4, -S'_F]$$

$$'Bs = [-e'_1, \psi_2, -e'_2, \psi_3, -e'_3, \psi_4, -S'_F]$$

$$e'_1 = e'_{10} + x_1$$

$$e'_2 = e'_{20} - x_1 + X_2$$

$$e'_3 = e'_{30} - X_2$$

These processes 101 to 105 constitute a total system I responsive to the difference of the position of the third group 23 from the reference position for producing an output signal representative of the object distance.

When the focal length of the zoom objective is varied by moving the second group 22, the amount of movement $x_1$ of the second group 22 from the reference position is detected by a process 106. According to the detected values of $x_1$ and $X_2$ by the processes 106 and 105, a process 107 computes the required amount of movement $X_2'$ of the third group 23 from the reference position of FIG. 12A based on the formula:

$$X'_2 = \frac{-M \pm \sqrt{M^2 - 4LN}}{2L}$$

wherein, $$L = -H$$

$$M = H(-e'_{20} + e'_{30} + x_1) + I - J$$

$$N = H(e'_{20} - x_1)e'_{30} + I(e'_{20} - x_1) + J \cdot e'_{30} + K$$

$$H = \psi_3'C_2(1 - \psi_4 S'_F)$$

$$I = -'C_2\{1-(\psi_3\psi_4)S'_F\}$$

$$J = -(\psi_3'A_2 + 'C_2)(1-\psi_4 S'_F)$$

$$K = 'A_2\{1-(\psi_3+\psi_4)S'_F\} - 'C_2 S'_F$$

$$'A_2 = [\psi_1, -E'_1]$$

$$'C_2 = [\psi_1, -e'_1, \psi_2]$$

$$e'_1 = e'_{10} + x_1$$

Responsive to the output of the process 107, a process 108 drive the third group for adjustment of the position thereof so that the image shift is compensated for.

What is claimed is:

1. A zoom lens comprising:
   first and second fixed lens groups both unmovable during zooming and during focusing, first and second movable lens groups both arranged between the first fixed lens group and the second fixed lens group, said first movable lens group being movable during zooming and during focusing, and said second movable lens group being movable during zooming,
   first detection means for detecting the distance which the first movable lens group departs from a predetermined standard position in a first lens condition,
   second detection means for detecting the distance which the second movable lens group departs from the predetermined standard position,
   third detecting means for detecting the distance which the first movable lens group departs from the predetermined standard position in a second lens condition when the first movable lens group is moved for focusing from the first lens condition, and
   means for determining a movable path for the first movable lens group in response to externally caused movement of the second movable lens group.

2. A zoom lens according to claim 1, in which the first and second movable lens groups move so as to monotonically vary the magnifying power of each of the movable lens groups.

* * * * *